Jan. 25, 1966     C. F. WEISGERBER     3,231,804
SERVO CONTROL DEVICE
Filed Oct. 17, 1961

INVENTOR.
CHARLES F. WEISGERBER
BY
W. H. Maxwell
AGENT

United States Patent Office 3,231,804
Patented Jan. 25, 1966

3,231,804
SERVO CONTROL DEVICE
Charles F. Weisgerber, 10312 E. Strong, Whittier, Calif.
Filed Oct. 17, 1961, Ser. No. 145,626
4 Claims. (Cl. 318—208)

This invention relates to the control of servo devices such as motors and the like and is particularly concerned with starting and stopping and reversing direction of movement is a servo device.

Broadly, this invention relates to any kind of electrically energized device wherein alternating current is employed to energize a field and wherein shading coils are used for control. A typical servo of this type is a reversible shaded pole motor with an alternating current field and having separately controllable shading coils that determine direction of rotation. This type of motor is characterized by high torque-to-inertia ratio, with rapid reversing for immediate response to signal input. The signal input is simply used to separately excite the shading coils in the proper phase relationship, thereby directing movement of the motor armature. Such a motor, because of the shaded pole induction, provides inherent dynamic braking and over-travel is minimized, and said induction at the shading coils is utilized in the present invention for powering of the control.

Heretofore, switches and electronic circuits have been employed to control the shading coils or induction coils of various types of electrical motors and like equipment. Because of the high current flow in such shading coils or induction windings heavy duty switching devices must be employed, or alternatively electronic switching circuits must be employed. The latter circuits are preferable in that switch contacts are avoided where high currents are involved, and it is this type of circuitry with which the present invention is concerned. However, circuits of the type under consideration have been necessarily cumbersome and complex and characteristically require external power for their operation.

An object of this invention is to provide an electronic circuit control for shading coils or secondary windings of a motor or the like whereby action is controlled. It will be apparent that the present invention has utility in any situation where control coils are involved in a transformer relationship, said control coils being in the nature of secondary windings of a transformer.

Another object of this invention is to provide an electronic circuit control for shading coils or secondary windings that is self-energized, thereby eliminating the necessity of any outside power source.

It is still another object of this invention to provide an electronic circuit control of the character thus far referred to that is relatively simple and which avoids complexity and troublesome circuitry. The servo control hereinafter described is reduced to bare essentials without sacrificing reliability and accuracy of control, and with the result that the structural embodiment of the present invention is economically sound from the standpoints of manufacture, use and maintenance.

The various objects and features of this invention will be fully understood from the following detailed description of the typical preferred form and application thereof, throughout which description reference is made to the accompanying drawings, in which.

Figure 1:
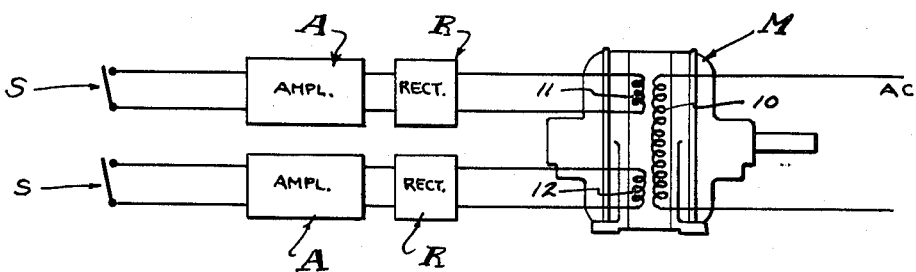
FIG. 1 is a block diagram of the servo control of the present invention showing it applied to a reversible electric motor.

In the drawings I have shown a block diagram in FIG. 1 in order to illustrate the general relationship of elements that are involved. Generally, the invention contemplates the control of some piece of electrical equipment, and for purpose of illustration I have shown a motor M. It is to be understood, however, that other electrical equipment can be controlled, providing said equipment has shading coils or secondary windings, or the like, equivalent to those herein disclosed. As indicated in FIG. 1, one or more amplifiers A are associated with the motor M, and there is a suitable switch S associated with each amplifier in order to complete the signal circuits in order to render the motor M operable or inoperable, as circumstances require.

Figure 2:
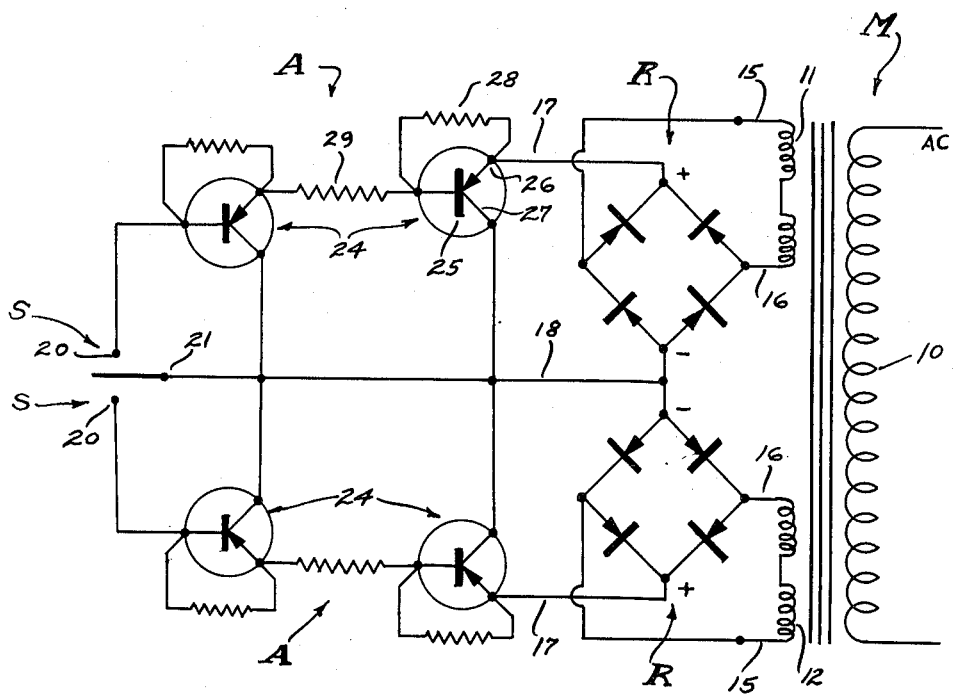
FIG. 2 is a schematic electrical wiring diagram of the circuitry involved in the present invention.

The particular motor M that I have shown is a reversible electric motor having a continuously energized field 10 supplied by alternating current. Rotation of this motor is determined by the closing of certain circuits through shading coils positioned so as to cause rotation in one direction or the other. For example, there are coils 11 for causing rotation in one direction, and there are coils 12 for causing rotation in the other direction. The coils 11 and 12 being associated with the alternating field 10 act as secondary windings when a circuit is completed therethrough and therefore one coil 11 or 12 is closed in a circuit at a time whereby rotation of the motor is in one direction or the other. Also, without closing of a circuit through either coil 11 or 12 the motor remains idle, there being high impedance in the field 10 and very little current flow therethrough. As best illustrated in the diagram of FIG. 2, the coils 11 and 12 may be split into sections that are positioned as circumstances require in order to have a phase relationship that will cause the desired rotation of the motor, when said respective coils are closed in a circuit.

As shown, the coils 11 and 12 are individually included in circuits by closing individual switches S, there being a switch S for each coil to be put into operation. Although the particular motor M under consideration has two shading coils, it is to be understood that such a motor could have but one shading coil or more than two such coils. Thus, it will be apparent that the configuration of the circuit or circuits herein disclosed will vary depending upon the number of shading coils to be controlled. Essentially, an amplifier A is associated with each shading coil to be controlled, this being indicated by the block diagram of FIG. 1.

The amplifiers A are alike and they can vary widely as circumstances require. For instance, tube amplifiers, magnetic amplifiers, or transistor amplifiers can be employed as desired. For purpose of illustration I have chosen the latter type in that little power is required to operate the same and whereby suitable amplification can be readily gained (i.e., 3000 to 1). However, the transistor amplifier requires direct current for its operation in which case I provide a suitable rectifier R which can also vary widely in type. For example, the rectifier R can be a solid state plate-type rectifier adapted to alter alternating current into pulsating direct current which is satisfactory for operation of the circuits involved. However, when other types of amplifiers are employed rectification may not be required or it may be included therein.

In accordance with the invention a circuit is provided through the coil 11 (or 12), the amplifier A and the switch S. In the particular form of invention illustrated the circuit is provided through the rectifier R. As shown in FIG. 1 the coil 11 (or 12), the amplifier A and the switch S are in series, the amplifier A being powered by means of current induced in the coil 11 (or 12) when the switch S is closed. Therefore, the rectifier R is connected to opposite end taps 15 and 16 of the coil 11 (or 12), and the output of the rectifier R is conducted to the amplifier A by means of + and − conductors 17 and 18. The conductors 17 and 18 extend to the switch S where there are contacts 20 and 21. The amplifier A is in the circuit composed of the conductors 17 and 18, preferably in the conductor 17.

The amplifier A can vary widely and is shown as involving a two-stage transistor, each stage including a transistor 24 with a base 25, an emitter 26 and a collector 27. Each transistor 24 has a resistor 28 in parallel therewith, and there is also a resistor 29 intermediate the two transistors. As shown, the conductor 17 extends through the transistors 24 at the emitters 26, while the collectors 27 extend to the conductor 18. As a result, a very low current passes through the contacts 20 and 21 while a substantially heavy current passes through the rectifier and coil 11 (or 12). However, when the switch S is open there is no flow through the circuit extending through said rectifier R, amplifier A and switch S, as above described.

In the particular case illustrated, there are two shading coils 11 and 12, one for rotation in each of opposite directions. Therefore, I employ two separate circuits, each including its own rectifier R, amplifier A and switch S. In accordance with the preferred form of the invention, the conductors 18 of the two circuits involved are common to each other and the two switches S are combined into one, a double throw switch, wherein there are opposite contacts 20 and a single central contact 21. Therefore, in practice, there is but one conductor 18. It will be seen that the said double throw switch can close but one circuit at a time and that but one circuit to either coil 11 or 12 is energized at one time. Said energization is accomplished by induction from the field 10 through the secondary windings in the form of shading coils.

From the foregoing it will be apparent that I have provided a very simple and expedient circuitry that is self-energizing and which requires no external source or supply of energy. The transistorized circuit that I prefer to employ requires very little power, if any, for its operation and with its ability to highly amplify the current flowing through the signal handling switch S a very practical and usable current is available at the shading coils 11 or 12. As a result, the shading coils 11 and/or 12 are properly excited or closed in a circuit whereby full advantage is realized of them and so that the motor M is efficiently driven in either direction, as required. When the circuits to coils 11 and 12 are open there is a high impedance at said coils, and this impedance value is reflected at the coil 10 with a high impedance and results in a small current flow in the A.C. power supply. However, when the coils 11 and/or 12 are closed, or shorted, the impedance value drops with a consequent reflection at the coil 10 and with the result that a large current flow occurs in the A.C. power supply. It will now be apparent that this radical decrease and increase of current flow in the A.C. power supply can be used to advantage to control operation of other devices put in series with the coil 10.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. An electrically energized device having an alternating field and a shading coil and control circuit therefor, and including, a rectifier in the circuit between the end taps of the shading coil, a transistor amplifier with its output in the said end taps of the shading coil and powered solely through induction in said shading coil by a direct current circuit from the rectifier and comprising a transistor with its emitter and collector elements connected to opposite sides of the direct current circuit, and an independently operable switch connected to one side of the direct current circuit and to the base of the transistor and for biasing the transistor to close the circuit through the amplifier and to the other side of the direct current circuit whereby a small current flowing through the switch results in a large current flow through the shading coil.

2. An electrically energized device having an alternating field and a shading coil and control circuit therefor, and including, a rectifier in the circuit between the end taps and the shading coil, a transistor amplifier with its output in the said end taps of the shading coil and powered solely through induction in said shading coil by a direct current circuit from the rectifier and comprising transistors with emitter and collector elements connected to opposite sides of the direct current circuit, and an independently operable switch connected to one side of the direct current circuit and to the base of one transistor and for biasing the said transistor to close the circuit to the other transistor and through the amplifier to the other side of the direct current circuit whereby a small current flowing through the switch results in a large current flow through the shading coil.

3. An electrically energized device having an alternating field and separate shading coils and individual control circuits therefor, and including, a rectifier in a circuit between the end taps of each shading coil, a transistor amplifier with its output connected to and powered solely through induction in said shading coil by a direct current circuit from each rectifier and comprising a transistor with a base and with its emitter and collector elements connected to opposite sides of the direct current circuit, and an independently operable switch contact in and to close each of said circuits to the base of its respective transistor whereby a small current flowing through the switch contacts respectively results in a large current flow through the shading coils respectively.

4. An electrically energized device having an alternating field and separate shading coils and individual control circuits therefor, and including, a rectifier in a circuit between the end taps of each shading coil, a transistor amplifier with its output connected to and powered solely through induction in said shading coil by a direct current circuit from each rectifier and comprising transistors and each with a base and each with emitter and collector elements connected to opposite sides of the direct current circuit, and an independently operable switch contact in and to close each of said circuits to the base of one of its respective transistors whereby a small current flowing through the switch contacts respectively results in a large current flow through the shading coils respectively.

References Cited by the Examiner
UNITED STATES PATENTS

| | | |
|---|---|---|
| 2,777,057 | 1/1957 | Pankove. |
| 2,783,423 | 2/1957 | Streater et al. _____ 318—208 X |
| 2,935,674 | 5/1960 | Hohne et al. _____ 318—325 X |
| 3,051,882 | 8/1962 | Stoudenmire _____ 318—208 X |

ORIS L. RADER, *Primary Examiner.*

JOHN F. COUCH, *Examiner.*